US012737847B2

(12) United States Patent
Qu et al.

(10) Patent No.: US 12,737,847 B2
(45) Date of Patent: Sep. 15, 2026

(54) EYEGLASS REFLECTION SYNTHESIS FOR REFLECTION REMOVAL

(71) Applicant: Adobe Inc., San Jose, CA (US)

(72) Inventors: Hui Qu, San Jose, CA (US); Wei-An Lin, San Jose, CA (US); Ratheesh Kalarot, San Diego, CA (US)

(73) Assignee: ADOBE INC., San Jose, CA (US)

( * ) Notice: Subject to any disclaimer, the term of this patent is extended or adjusted under 35 U.S.C. 154(b) by 208 days.

(21) Appl. No.: 18/328,508

(22) Filed: Jun. 2, 2023

(65) Prior Publication Data

US 2024/0404012 A1 Dec. 5, 2024

(51) Int. Cl.
*G06T 5/50* (2006.01)
*G06T 3/18* (2024.01)
(Continued)

(52) U.S. Cl.
CPC .................. *G06T 5/50* (2013.01); *G06T 3/18* (2024.01); *G06T 5/77* (2024.01); *G06T 7/0002* (2013.01); *G06T 7/11* (2017.01); *G06T 11/10* (2026.01); *G06T 2207/10024* (2013.01); *G06T 2207/20021* (2013.01); *G06T 2207/20081* (2013.01);
(Continued)

(58) Field of Classification Search
CPC ........... G06T 11/001; G06T 3/18; G06T 5/50; G06T 5/77; G06T 7/0002; G06T 7/11
See application file for complete search history.

(56) References Cited

U.S. PATENT DOCUMENTS

2013/0328859 A1* 12/2013 Jones ...................... G06T 11/00
345/419
2019/0102872 A1* 4/2019 Moussa ..................... G06T 7/30
(Continued)

FOREIGN PATENT DOCUMENTS

CN 110263475 A * 9/2019 ......... G06F 17/5009
CN 112884684 A * 6/2021 ........... G06K 9/6201
EP 2339534 A1 * 6/2011 ............. G06T 5/005

OTHER PUBLICATIONS

Dai, Yuekun, et al. "Flare7k: A phenomenological nighttime flare removal dataset." Advances in Neural Information Processing Systems 35 (2022): 3926-3937. (Year: 2022).*
(Continued)

*Primary Examiner* — Daniel F Hajnik
*Assistant Examiner* — Brianna Renae Cochran
(74) *Attorney, Agent, or Firm* — Shook Hardy & Bacon L.L.P.

(57) ABSTRACT

Systems and methods generate paired image data comprising synthesized eyeglass reflections and use the paired image data to train a machine learning model for reflection removal. A training dataset is generated that includes image pairs. Each image pair comprises a first version of a face image with eyeglasses not having a reflection and a second version of the face image with eyeglasses having a reflection. A first image pair in the training dataset is generated by: obtaining a first face image with eyeglasses not having a reflection, obtaining a reflection image, and generating a composite image using the first face image and the reflection image. Once generated, the training dataset is used to train a machine learning model to provide a trained machine learning model that performs reflection removal on input face images with eyeglass reflections.

15 Claims, 9 Drawing Sheets

(51) Int. Cl.

| | |
|---|---|
| ***G06T 5/77*** | (2024.01) |
| ***G06T 7/00*** | (2017.01) |
| ***G06T 7/11*** | (2017.01) |
| ***G06T 11/10*** | (2026.01) |

(52) U.S. Cl.

CPC ............... *G06T 2207/20212* (2013.01); *G06T 2207/30168* (2013.01); *G06T 2207/30201* (2013.01)

(56) References Cited

U.S. PATENT DOCUMENTS

| | | | | |
|---|---|---|---|---|
| 2019/0129165 | A1* | 5/2019 | Kang | G06N 3/08 |
| 2023/0320582 | A1* | 10/2023 | Monma | A61B 3/0025<br>351/239 |
| 2024/0005464 | A1* | 1/2024 | Khizbullin | G06N 3/09 |
| 2024/0037821 | A1* | 2/2024 | Toizumi | G06T 3/40 |

OTHER PUBLICATIONS

A. Levin and Y. Weiss, “User Assisted Separation of Reflections from a Single Image Using a Sparsity Prior,” in IEEE Transactions on Pattern Analysis and Machine Intelligence, vol. 29, No. 9, pp. 1647-1654, Sep. 2007, doi: 10.1109/TPAMI.2007.1106. (Year: 2007).*

S. Watanabe and M. Hasegawa, “Reflection Removal on Eyeglasses Using Deep Learning,” (2021) 36th International Technical Conference on Circuits/Systems, Computers and Communications (ITC-CSCC), Jeju, Korea (South), 2021, pp. 1-4, doi: 10.1109/ITC-CSCC52171.2021.9501489. (Year: 2021).*

S. Watanabe and M. Hasegawa, “Reflection Removal on Eyeglasses Using Deep Learning,” (2021) 36th International Technical Conference on Circuits/Systems, Computers and Communications (ITC-CSCC), Jeju, Korea (South), 2021, pp. 1-4, doi: 10.1109/ITC-CSCC52171.2021.9501489. (Year: 2021) (Year: 2021).*

Dai, Yuekun, et al. “Flare7k: A phenomenological nighttime flare removal dataset.” Advances in Neural Information Processing Systems 35 (2022): 3926-3937. (Year: 2022) (Year: 2022).*

YouTube Video, Title: “Davinci Resolve—How to add reflections to sunglasses” Author: Samsote Date: Jul. 29, 2020 Link: https://www.youtube.com/watch?v=911GglObYg8. (Year: 2020).*

“Magically Remove Glare from Glasses in Photoshop!”, YouTube, Retrieved from Internet URL: https://www.youtube.com/watch?v=pIOsuoh0eFg, accessed on Aug. 21, 2023, pp. 3.

Sandhan, T., and Choi, J. Y., “Anti-Glare: Tightly Constrained Optimization for Eyeglass Reflection Removal”, Proceedings of the IEEE Conference on Computer Vision and Pattern Recognition (CVPR), pp. 1241-1250 (2017).

Wan, R., et al., “Benchmarking Single-Image Reflection Removal Algorithms”, Proceedings of the IEEE International Conference on Computer Vision (ICCV), pp. 3922-3930 (2017).

Chi, Z., et al., “Single Image Reflection Removal Using Deep Encoder-Decoder Network”, arXiv:1802.00094v1, pp. 1-10 (Jan. 31, 2018).

Wen, Q., et al., “Single Image Reflection Removal Beyond Linearity”, Proceedings of the IEEE/CVF Conference on Computer Vision and Pattern Recognition (CVPR), pp. 3771-3779 (2019).

Ye, S., et al., “Single Image Glare Removal Using Deep Convolutional Networks”, 2020 IEEE International Conference on Image Processing (ICIP), pp. 201-205 (2020).

* cited by examiner

EYEGLASS REFLECTION SYNTHESIS FOR REFLECTION REMOVAL

BACKGROUND

Reflections on eyeglasses in face images often degrade the aesthetic value of the images and, as such, are usually undesirable in photographs. Users often want to obtain clean images by removing reflections from the eyeglasses. However, manually editing images to remove eyeglass reflections using image editing tools, such as the Adobe Photoshop application, typically requires professional skills and is time-consuming. Furthermore, machine learning models trained to automatically perform eyeglass reflection removal are challenging to develop due to the need for a large volume of high-quality training data.

SUMMARY

Some aspects of the present technology relate to, among other things, an image processing system that synthesizes eyeglass reflections and uses the synthesized eyeglass reflections to train a machine learning model for eyeglass reflection removal. In accordance with some aspects, the image processing system generates a training dataset with paired image data in which each image pair includes a face image without an eyeglass reflection and a composite image in which an eyeglass reflection has been added. To generate an image pair, the image processing system obtains (e.g., generates) a face image with eyeglasses that do not have a reflection, obtains a reflection image, and generates a composite image from the reflection image and the face image. In some aspects, the face image is generated using a generator model, such as, for instance, the StyleGAN2 model. In some aspects, the image processing system uses different types of reflection images, such as, for instance, glare reflection images and scene reflection images to generate composite images with different types of reflections.

The image processing system generates a composite image from a face image and a reflection image by determining a reflection area in the eyeglasses in the face image and compositing the reflection image in the reflection area of the face image. The reflection area can be determined, for instance, by performing eyeglass segmentation on the face image to identify an eyeglasses area, generating a polygon around a point within the eyeglasses area, and determining the reflection area as an intersection of the eyeglasses area and the polygon. The composite image can be generated, for instance, by warping the reflection image to the shape/size of the reflection area and determining pixel values of an area of the composite image corresponding to the reflection area of the face image based on weighted pixel values of the warped reflection image and weighted pixel values from the reflection area of the face image.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
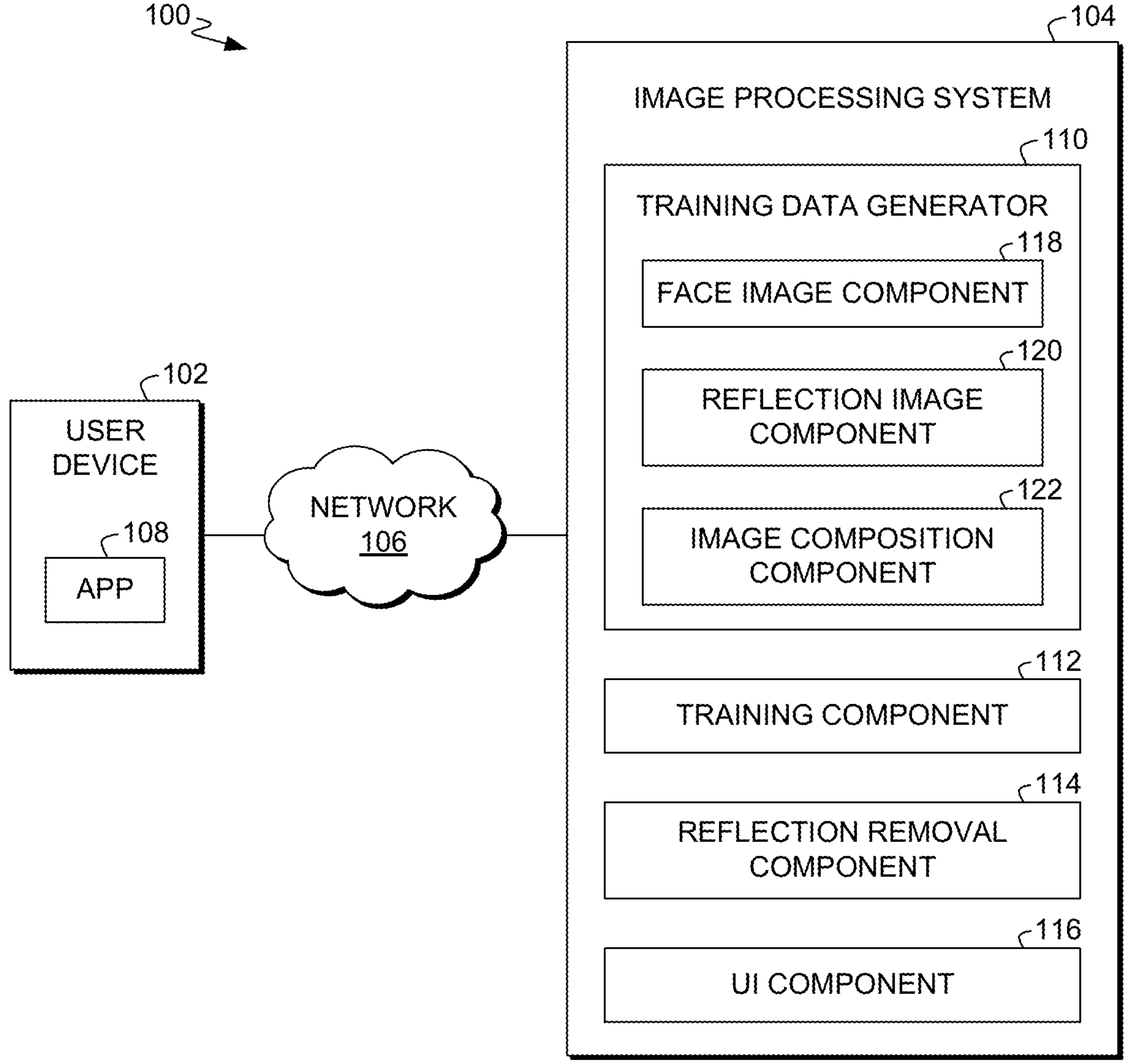
FIG. 1 is a block diagram illustrating an exemplary system in accordance with some implementations of the present disclosure.

The ability of trained machine learning models to remove eyeglass reflections from images depends heavily on the quality of the data used to train the models. Generally, it has proven difficult to obtain a large volume of high-quality images to effectively train machine learning models for eyeglass reflection removal. For instance, there are a number of obstacles to collect a large dataset of real paired eyeglasses reflection images. One problem is the difficulty in finding different faces wearing eyeglasses. It would be practically infeasible to do this manually on a large image dataset, and automated approaches may not effectively identify such images from an image dataset. Manually capturing photographs with and without reflections is likewise impractical given the number of images required. Moreover, it is hard to capture images with and without reflections that strictly align with each other as there will be pixel shifts during two shots of images with and without a reflection.

Aspects of the technology described herein improve the functioning of the computer itself in light of these shortcomings in existing technologies by providing an image processing system that synthesizes images with eyeglass reflections and employs the synthesized images to train a machine learning model for eyeglass reflection removal. More particularly, the image processing system generates paired image data in which each image pair includes a face image having eyeglasses without a reflection and a composite image in which a reflection image is composited with the face image to provide a version of the face image in which the eyeglasses have a reflection.

In accordance with some aspects of the technology described herein, an image pair is generated by obtaining a face image in which a face has eyeglasses without a reflection, obtaining a reflection image, and generating a composite image from the face image and reflection image by compositing the reflection image in a reflection area of the eyeglasses of the face image.

The face image can be a real image (i.e., a photograph of a face that either initially included eyeglasses or has been edited to include eyeglasses) or a virtual image (i.e., an image generated by a generator model, such as the StyleGAN2 model). The reflection image can be, for instance, a glare reflection image or a scene reflection image. A glare reflection is typically a result of a strong light source and has different colors due to the color of the light source and eyeglasses coating. In some aspects, a glare refection image is generated by selecting a random color and generating a gradient image from the random color. A scene reflection refers to a reflection that contains detailed structures in the real world, such as, for instance, buildings, window frames, trees, etc. The scene reflection image can be a real image (i.e., a photograph of a scene) or a virtual image (i.e., an image of a scene generated by a generator model). Different types of reflections can be used for different composite images to provide a robust training dataset.

In some aspects, a composite image is generated by determining a reflection area in the eyeglasses of the face image, warping the reflection image to the size/shape of the reflection area, and determining pixel values for an area of the composite image corresponding to the reflection area of the face image based on weighted pixel values from the warped reflection image and weighted pixel values from the reflection area of the face image. In some aspects, the reflection area is determined by performing eyeglasses segmentation on the face image to identify an eyeglasses area, generating a polygon around a point within the eyeglasses area, and determining the reflection area as an intersection of the eyeglasses area and the polygon area. This ensures that the reflection area does not consume the entire eyeglasses since eyeglass reflections do not typically consume the entire eyeglasses in real photographs. In some aspects, the weight used to composite the reflection image with face image is varied across different image pairs to vary the intensity/opacity of the synthesized eyeglass reflections in order to provide a robust training dataset.

Aspects of the technology described herein provide a number of improvements over existing technologies. For instance, aspects of the technology described herein are able to generate a large volume of high-quality image pairs in which each image pair includes a first version of a face image without an eyeglass reflection and a second version of the face image with an eyeglass reflection. The image pairs include a large variety of faces with different poses and different types of eyeglasses, as well as different types of reflections with varying intensity/opacity. This provides a robust training dataset. As a result, a machine learning model trained on the paired image data generated using technologies described herein provides improved performance in eyeglass reflection removal.

Example System for Eyeglass Reflection Synthesis and Reflection Removal

With reference now to the drawings, FIG. 1 is a block diagram illustrating an exemplary system 100 for synthesizing images with eyeglass reflections and using the synthesized images to train a machine learning model for eyeglass reflection removal in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image processing system 104. Each of the user device 102 and image processing system 104 shown in FIG. 1 can comprise one or more computer devices, such as the computing device 1200 of FIG. 12, discussed below. As shown in FIG. 1, the user device 102 and the image processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image processing system 104 could be provided by multiple server devices collectively providing the functionality of the image processing system 104 as described herein. Additionally, other components not shown can also be included within the network environment.

The user device 102 can be a client device on the client-side of operating environment 100, while the image processing system 104 can be on the server-side of operating environment 100. The image processing system 104 can comprise server-side software designed to work in conjunction with client-side software on the user device 102 so as to implement any combination of the features and functionalities discussed in the present disclosure. For instance, the user device 102 can include an application 108 for interacting with the image processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the image processing system 104 remain as separate entities. While the operating environment 100 illustrates a configuration in a networked environment with a separate user device 104 and image processing system 104, it should be understood that other configurations can be employed in which components are combined. For instance, in some configurations, the user device 102 can provide some or all of the capabilities of the image processing system 104 described herein.

The user device 102 comprises any type of computing device capable of use by a user. For example, in one aspect, the user device comprises the type of computing device 1200 described in relation to FIG. 12 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the image processing system 104 via the user device 102.

As will be described in further detail below, the image processing system 104 generates a training dataset, uses the training dataset to train a machine learning model, and employs the trained machine learning model to perform eyeglass reflection removal on input images having eyeglass reflections. The training dataset generated by the image processing system 104 comprises image pairs with synthesized eyeglass reflections. Each image pair includes a face image and a composite image generated from the face image and a reflection image. More particularly, the face image comprises an image of a face with eyeglasses in which the eyeglasses do not have an eyeglass reflection. The image processing system 104 generates the composite image by compositing the reflection image within the eyeglasses of the face image. As such, the composite image is a version of the face image in which the eyeglasses have a reflection. As used herein, the term "face image" refers broadly to any image in which a face can be seen in the image. This includes images with a partial face and images having multiple faces and/or other objects.

As shown in FIG. 1, the image processing system 104 includes a training data generator 110, a training component 112, a reflection removal component 114, and a user interface component 116. The components of the image processing system 104 can be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the image processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The training data generator 110 of the image processing system 104 generates training data used to train a machine learning model to perform eyeglass reflection removal on images. In accordance with aspects of the present technology, the training data generator 110 generates a training dataset that comprises image pairs, in which each image pair includes a first version of a face image with eyeglasses that do not have a reflection and a second version of the face image in which the eyeglasses have a reflection. Formally, the training data generator 110 generates a list of paired data $$(I_0, I_0^r),$$

where $I_0$ is an original face image with eyeglasses not having a reflection, and $$I_0^r$$

is a composite face image generated by adding an eyeglass reflection to the original face image $I_0$ based on a reflection image $I^r$.

Figure 2:
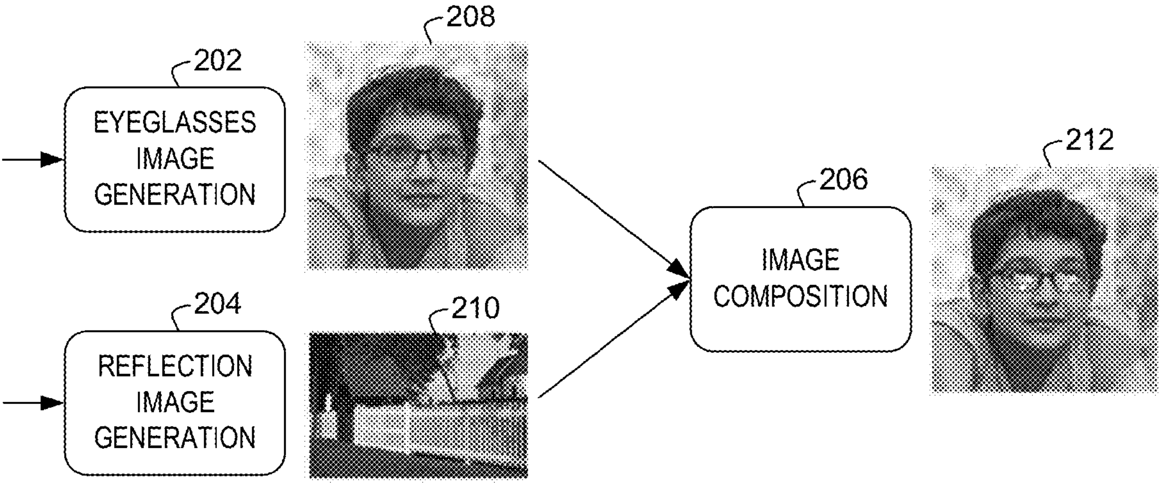
FIG. 2 is a block diagram illustrating an example pipeline for generating paired image data in accordance with some implementations of the present disclosure.

By way of illustration, FIG. 2 provides a block diagram showing an example synthesis pipeline employed by the training data generator 110 to generate paired image data in accordance with some aspects. As shown in FIG. 2, the pipeline includes three steps: (1) face image generation 202, (2) reflection image generation 204, and (3) image composition 206. As will be described in further detail below, face image generation 202 involves providing an original face image 208 with eyeglasses not having a reflection ($I_0$). Reflection image generation 204 involves providing a reflection image 210 ($I^r$) to be used to provide a composite image having an eyeglass reflection. Image composition 206 involves using the original face image 208 (in which the eyeglasses do not have a reflection) and the reflection image 210 to generate a composite image 212

$$(I_0^r)$$

(in which the eyeglasses have a reflection). By way of example only and not limitation, the image composition can be defined as:

$$I_0^r = \alpha I_0 + \beta f(I^r) \tag{1}$$

where $I_0$ is the original face image with eyeglasses not having a reflection, $$I_0^r$$

is the composite face image with an eyeglass reflection added to $I_0$, $I^r$ is the reflection image, f is a warping function that maps $I^r$ to a certain area inside the eyeglasses, α and β are weight maps for the original face image and reflection image during composition, respectively.

With reference again to FIG. 1, the training data generator 110 includes a face image component 118, a reflection image component 120, and an image composition component 122 that collectively provide the pipeline for generating paired image data. The face image component 118 provides face images, in which each face image comprises an image of a face with eyeglasses where the eyeglasses do not have a reflection. The face image component 118 can provide the original face images in any of a number of different manners within the scope of embodiments of the present technology. The original face images can be "real images" (i.e., images from photographs with or without any image editing) and/or "virtual images" (i.e., images generated by a generator model). For instance, the face image component 118 can provide real images of faces having eyeglasses that do not have a reflection (e.g., from an existing image database). In some instances, the face image component 118 obtains real images of faces without eyeglasses and generates the original face images by adding eyeglasses without reflections to the faces in the images.

Figure 3:
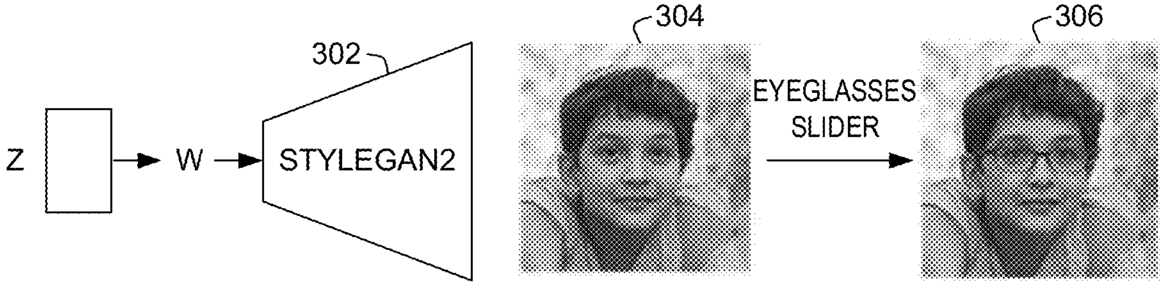
FIG. 3 is a block diagram illustrating an example of generating a face image with eyeglasses not having a reflection in accordance with some implementations of the present disclosure.

In some instances, the face image component 118 generates face images using a generator model. By way of example only and not limitation, the face image component 118 could use a generator model, such as the StyleGAN2 model, to generate face images with eyeglasses not having a reflection. The StyleGAN2 model can generate high-resolution face images, as well as provide face attribute editing. FIG. 3 provides a block diagram showing an example of generating a face image using the StyleGAN2 model. As shown in FIG. 3, a StyleGAN2 model 302 generates a synthetic face image 304 by randomly sampling a z vector in the Z space, generating W latent code (for instance, with a truncation factor of 0.7), and generating the output image 304 with the Wp codes. Next, a pre-trained segmentation model is employed to determine whether there are eyeglasses in the generated face image. If not, an eyeglasses slider in the StyleSpace of the StyleGAN2 model is used to add eyeglasses to the face image. In this way, an original face image 306 is generated with eyeglasses not having a reflection.

Turning again to FIG. 1, the reflection image component 120 of the training data generator 110 provides reflection images for compositing with original face images. There are various types of eyeglass reflections in the real world. Two main types are considered here: glare and scene reflection. However, other types of reflections can be used in various embodiments of the present technology.

Figure 4:
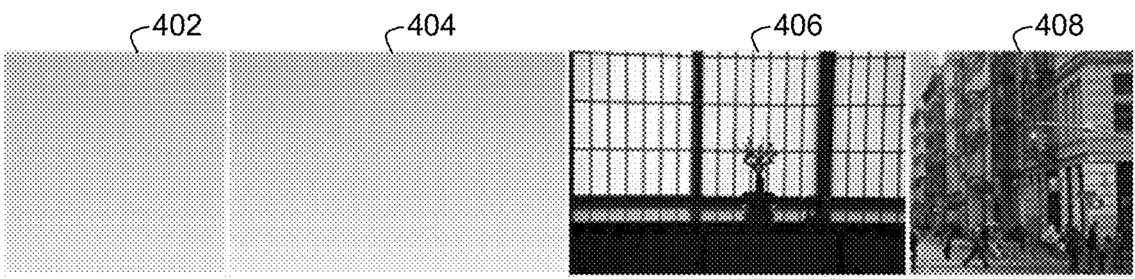
FIG. 4 is a diagram illustrating examples of reflection images in accordance with some implementations of the present disclosure.

Glare usually comes from the reflection of a strong light source and may have different colors due to the light color and eyeglasses coating. To replicate a glare, the reflection image component 120 selects a color. For instance, in some aspects, a random color (r, g, b) is obtained by either adding small variations to the gray color [200, 200, 200] to simulate a common transparent color, or sampling values from 0 to 255 in each RGB channel to cover other colors. A gradient image is generated based on the selected color (e.g., a random (r, g, b) color). In some aspects, light adjustment using gamma correction is then applied to avoid dark images. Examples of glare reflection images are shown by images 402 and 404 in FIG. 4.

Scene reflection refers to a reflection that contains detailed structures in the real world, such as, for instance, buildings, window frames, trees, etc. In some instances, the reflection image component 120 obtains scene reflection images from an existing image database, such as the ImageNet dataset. In other instances, the reflection image component 120 obtains scene reflection images using a generator model to generate images of scenes. In some aspects, classes are considered when selecting scene reflection images based on each class's likelihood of being presented in a reflection, e.g., windows, monitors, lakeside, etc. Examples of scene reflection images are shown by images 406 and 408 in FIG. 4.

In accordance with some configurations, the reflection image component 120 selects a reflection image type from different types of reflection images when generating each composite image from an original face image. This allows for composite images to be generated with a range of different types of reflections to provide for a robust training dataset. By way of example only and not limitation, the reflection image component 120 can employ algorithm 1 shown below to randomly select different types of reflection images.

Algorithm 1. Reflection image generation

Inputs:
- h: image height
- w: image width
- Ω: the dataset of real images selected from ImageNet Steps:
1. Random generate a value m in the range [0, 1]
2. If m > 0.7, random select a real image $I^r$ in the dataset Ω.
3. Else, generate a random color image
   a. Obtain a random color (r,g,b)
      i. Generate a random value n in the range [0, 1]
      ii. If n > 0.3, add random variations of range [0, 10] to the base color [200, 200, 200]
      iii. Else, randomly generate the values (r, g, b) in the range [0, 255]
   b. Generate a gradient image of size (h, w, 3) in the vertical direction using the color (r, g, b)
   c. Adjust the intensity of the image using gamma correction with a power of 0.3, get $I^r$
4. Return $I^r$ Outputs: $I^r$ The image composition component 122 of the training data generator 110 generates composite images from original face images and reflection images. More particularly, given a face image having eyeglasses without a reflection and a reflection image, the image composition component 122 combines the two images to form a composite image in which the eyeglasses from the face image have a reflection based on the reflection image. To generate a composite image, the image composition component 122 determines an eyeglasses area in an original face image, determines a reflection area within the eyeglasses area, and composites a reflection image in the reflection area to generate the composite image. As such, the image composition component 122 constrains the composition of the reflection image in the area of the eyeglasses.

Figure 5:
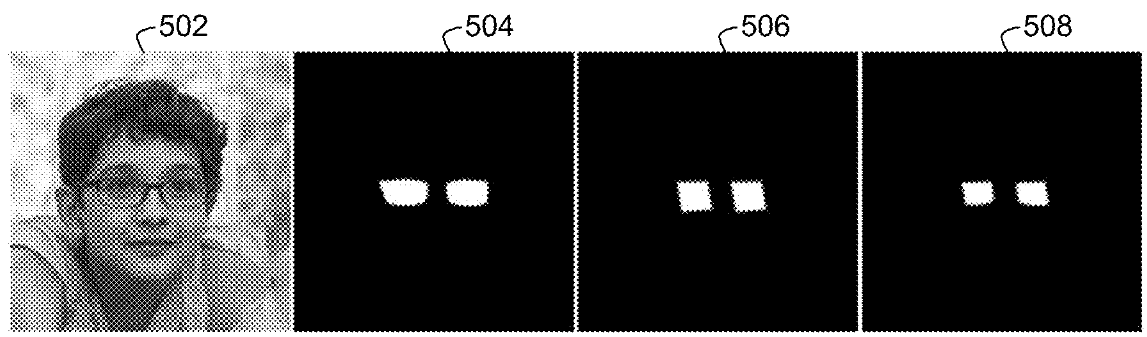
FIG. 5 is a block diagram illustrating an example of eyeglass segmentation and reflection area generation in accordance with some implementations of the present disclosure.

To determine an eyeglasses area in an original face image, the image composition component 112 can use a pre-trained face segmentation model that determines eyeglass pixels in the original face image. In some cases, a morphological erosion (e.g., with a radius of 20) and dilation (e.g., with a radius of 10) are applied to remove the frames. The result is an eyeglasses mask that identifies pixels where the lenses of the eyeglasses are located. By way of example, FIG. 5 illustrates an original face image 502. Performing eyeglass segmentation on the original face image 502 provides an eyeglasses mask 504 ($M_g$). As can be seen in FIG. 5, the white pixels in the eyeglasses mask 504 correspond with the pixels of the lenses of the eyeglasses in the original face image 502.

In real images, reflections typically only appear in a part of the eyeglasses, as opposed to the entire extent of the eyeglasses. To simulate this, the image composition component 122 determines an area within the eyeglasses area as a reflection area for compositing a reflection image. In some configurations, the image composition component 122 determines a reflection area by selecting a random point $p_1$ inside the eyeglasses area and generating a polygon of four points using $p_1$ as the central point and $R_1$ as the radius. For instance, $R_1$ can be a random integer in the range [30, 150]. This polygon can be mapped from one eyeglass to another eyeglass (i.e., between the two lenses) using the central points of the two eyeglasses, thereby providing a polygon area. Because the polygon area could extend outside of the eyeglasses area, a reflection area can be determined as the intersection of the eyeglasses area and the polygon area. By way of example to illustrate, FIG. 5 shows a polygon mask 506 ($M_p$) with a polygon area generated using a random point selected in an eyeglass of the eyeglasses area in the eyeglasses mask 504. A resulting reflection mask 508 ($M_r$) with a reflection area is provided based on an intersection of the eyeglasses mask 504 and the polygon mask 506

$$\text{(i.e., } M_r = M_g \cap M_p).$$

After determining the reflection area, the image composition component 122 composites a reflection image into the reflection area of the face image to generate a composite image that comprises the original face image with a reflection in the eyeglasses. In some aspects, the image composition component 122 warps the reflection image to the shape/size of the reflection area and applies weighting to pixel values from the warped reflection image and weighting to pixel values from the reflection area of the original face image to determine pixel values for a corresponding reflection area of the composite image. The weighting can be varied for different composite images to vary the intensity and opacity of reflections in the composite images to provide a robust training dataset.

Figure 6:
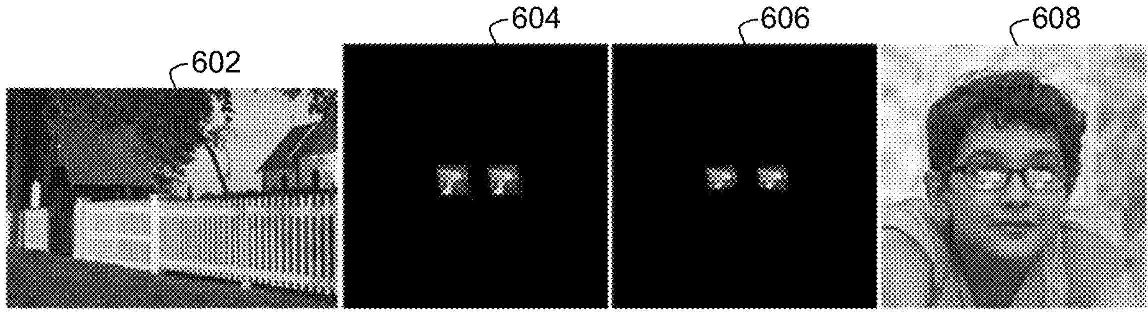
FIG. 6 is a block diagram illustrating an example of generating a composite image from warping a reflection image and compositing the warped reflection image with a face image in accordance with some implementations of the present disclosure.

By way of illustration, FIG. 6 shows a reflection image 602 ($I^r$) that is warped to two polygons to provide a warped reflection image 604 ($f(I^r)$). A weight map 606 (W) is generated where $$W = f(I^r)/255 \cdot M_r.$$

A variable $\sigma \in [0.2, 1.5]$ is defined to synthesize different reflection intensities. A composite image 608 is generated where the composition of the original face image $I_0$ and the warped reflection image $f(I^r)$ is defined as $$I_0^r = \begin{cases} (1 - 0.5W) \cdot I_0 + \sigma W \cdot f(I^r) & \text{if } \sigma > 0.5 \\ I_0 + \sigma W \cdot f(I^r) & \text{otherwise} \end{cases} \quad (2)$$

Figure 7:
FIG. 7 provides examples of paired image data generated in accordance with some implementations of the present disclosure.

In this way, the training data generator 110 produces a training dataset comprising paired image data, in which each image pair comprises an original face image having eyeglasses without a reflection and a composite image in which a reflection has been added to the eyeglasses in the original face image. By way illustration, FIG. 7 shows eyeglass reflection synthesis results, providing examples of paired image data produced by the training data generator 110. As shown in FIG. 7, each image pair includes an original face image on the left (i.e., not having an eyeglass reflection) and a composite image on the right (i.e., having an eyeglass reflection).

The training component 112 of the image processing system 104 employs this training dataset to train a machine learning model to perform eyeglass reflection removal on input images. The machine learning model could comprise, for instance, a deep learning model, such as a deep neural network. In some instances, the machine learning model comprises a pre-trained model, such as a CoModGAN model, that is further trained on the training dataset provided by the training data generator 110. In some instances, a model can be built from scratch using, for instance, convolutional neural networks (CNNs) or other deep learning architectures.

The training component 112 trains the machine learning model over a number of iterations in which the machine learning model learns to identify and remove reflections from eyeglasses. At each iteration, a composite image from an image pair (i.e., an image in which a reflection has been composited on eyeglasses in a face image) is provided as input to the machine learning model, which generates, from that composite image, a predicted image attempting to remove the reflection from the eyeglasses. Using the original face image from the image pair as a ground truth image, a loss function is employed by the training component 112 to determine a loss based on the predicted image and the ground truth image, and the machine learning model is updated based on the loss (e.g., by updating parameters/weights of the machine learning model).

Once the machine learning model has been trained on the training dataset, the reflection removal component 114 of the image processing system 104 employs the trained machine learning model for eyeglass reflection removal. Given an input image of a face having eyeglasses with a reflection, the trained machine learning model generates an output image of the face in which the reflection has been removed from the eyeglasses.

Figure 8:
FIG. 8 provides examples of reflection removal provided by a machine learning model trained using paired image data generated in accordance with some implementations of the present disclosure.

FIG. 8 provides examples of eyeglass reflection removal provided by a machine learning model trained on paired image data generated using the eyeglass reflection synthesis techniques described herein. In each pair shown in FIG. 8, the left image is an input image of a face having eyeglasses with a reflection. The right image is the output from the trained machine learning model in which the reflection has been removed (completely or partially) from the eyeglasses.

The image processing system 104 further includes a user interface component 116 that provides one or more user interfaces for interacting with the image processing system 104. The user interface component 116 provides one or more user interfaces to a user device, such as the user device 102. In some instances, the user interfaces can be presented on the user device 102 via the application 108, which can be a web browser or a dedicated application for interacting with the image processing system 104. For instance, the user interface component 116 can provide user interfaces for, among other things, interacting with the image processing system 104 to facilitate the generation of paired image data and/or to train a machine learning model for reflection removal using the paired image data. In some aspects, the user interface component 116 provides user interfaces for submitting images with eyeglass reflections and returning images with the eyeglass reflections removed.

Example Methods for Eyeglass Reflection Synthesis and Reflection Removal

Figure 9:
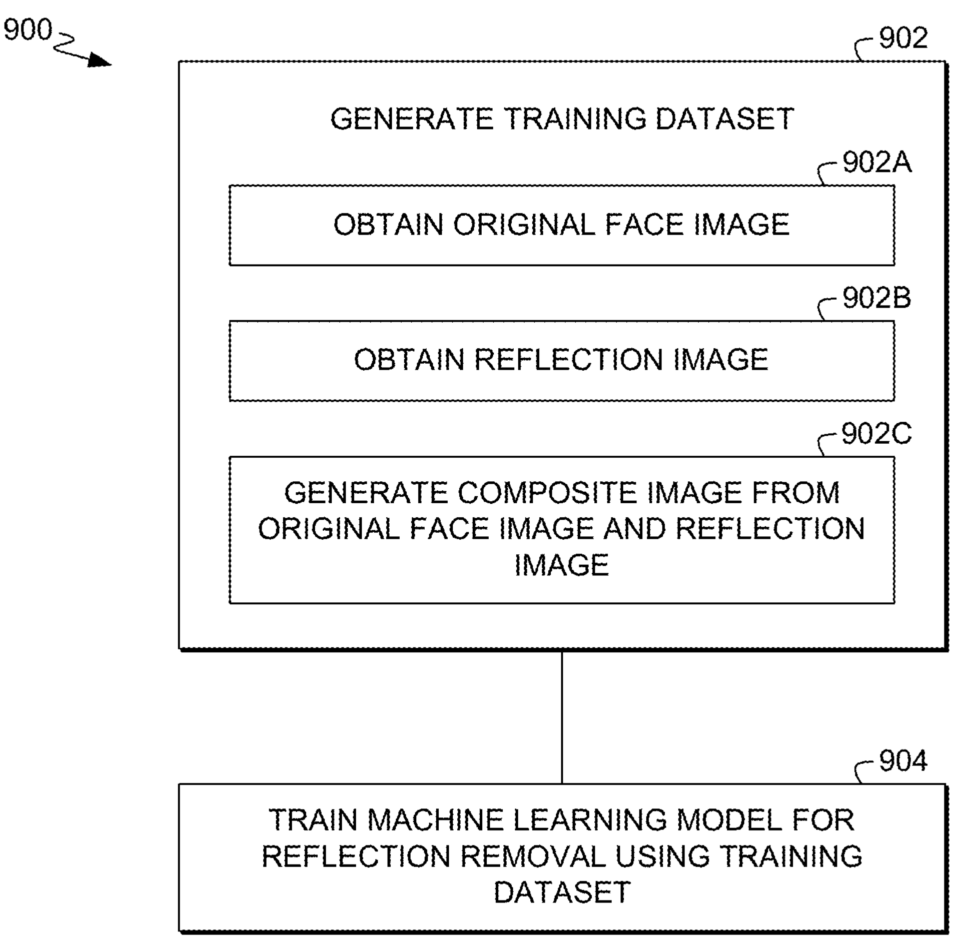
FIG. 9 is a flow diagram showing a method for generating paired image data by synthesizing eyeglass reflections and training a machine learning model for reflection removal using the paired image data as a training dataset in accordance with some implementations of the present disclosure.

With reference now to FIG. 9, a flow diagram is provided that illustrates a method 900 for generating paired image data by synthesizing eyeglass reflections and training a machine learning model for reflection removal using the paired image data as a training dataset. The method 900 can be performed, for instance, by the image processing system 104 of FIG. 1. Each block of the method 900 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 902, a training dataset is generated. The training dataset comprises paired image data in which each image pair includes a face image with eyeglasses not having a reflection and a composite image in which a reflection has been added to the eyeglasses from the original face image.

In accordance with some aspects of the technology described herein, generation of each image pair at block 902 comprises obtaining a face image with eyeglasses not having a reflection (as shown at block 902A), obtaining a reflection image (as shown at block 902B), and generating a composite image from the original face image and the reflection image (as shown at block 902C). In some instances, the face image is a real image depicting a face with eyeglasses not having a reflection. In some instances, the face image is a real image depicting a face that has been edited to add eyeglasses without a reflection. In some instances, the face image is a virtual image generated by a generator model. The reflection image can comprise, for instance, a glare reflection image or a scene reflection image, each of which can comprise a real image or a virtual image. It should be understood that when generating a training dataset with multiple image pairs, the original face images could include any combination of real images, edited real images, and/or virtual images. Additionally, the reflections images could include any combination of glare reflection images, scene reflection images, and/or other reflection images (which can be real images and/or virtual images).

The training dataset generated at block 902 is used to train a machine learning model for reflection removal, as shown at block 904. For each image pair from the training dataset, the composite image is used as input to the machine learning model, which generates a predicted image attempting to remove the reflection from the eyeglasses in the composite image. The original face image from the image pair is used as a ground truth image. A loss function is used to compute a loss based on the predicted image and the original face image, and parameters (e.g., weights) of the machine learning model are updated based on the loss.

Figure 10:
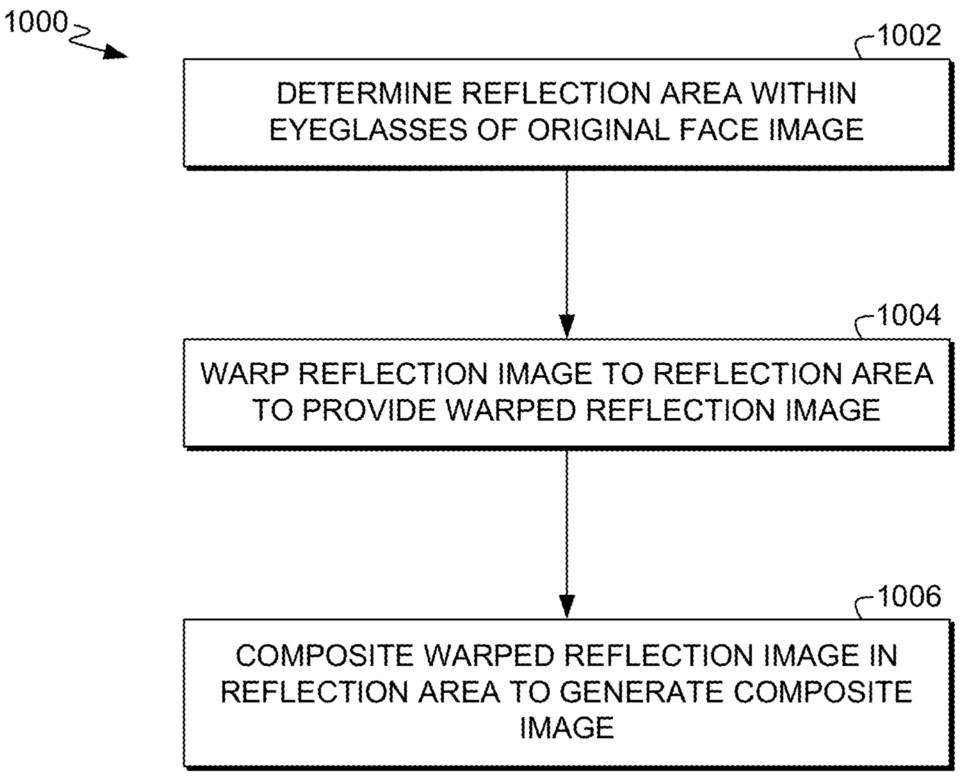
FIG. 10 is a flow diagram showing a method for generating a composite image from an original face image (not having an eyeglass reflection) and a reflection image in accordance with some implementations of the present disclosure.

FIG. 10 provides a flow diagram illustrating a method 1000 for generating a composite image (for instance, at block 902C of FIG. 9) from an original face image not having an eyeglass reflection and a reflection image. The method 1000 can be performed, for instance, by the image composition component 122 of FIG. 1. As shown at block 1002, a reflection area within eyeglasses of the original face image is determined. In some configurations, eyeglass segmentation is performed on the original face image to determine eyeglass areas—i.e., the pixels corresponding to the eyeglasses (i.e., the lenses). Polygons are generated around corresponding points within each eyeglass area. A reflection area is then generated from an intersection of the eyeglass areas and the polygons.

As shown at block 1004, the reflection image is warped to the reflection area for each eyeglass (i.e., each lens) to provide a warped reflection image for each eyeglass. The warped reflection image is composited within the reflection area for each eyeglass to provide a composite image, as shown at block 1006. In this way, the composite image corresponds with the original face image but has a reflection added to the eyeglasses in the image. In some instances, weighting is applied to pixel values from the warped reflection image and pixel values from the reflection area of the original face image when generating the composite image. To provide a robust training dataset, the weighting can be varied across different image pairs to vary the intensity/opacity of the reflections to simulate the varying intensity/opacity of reflections in real images.

Figure 11:
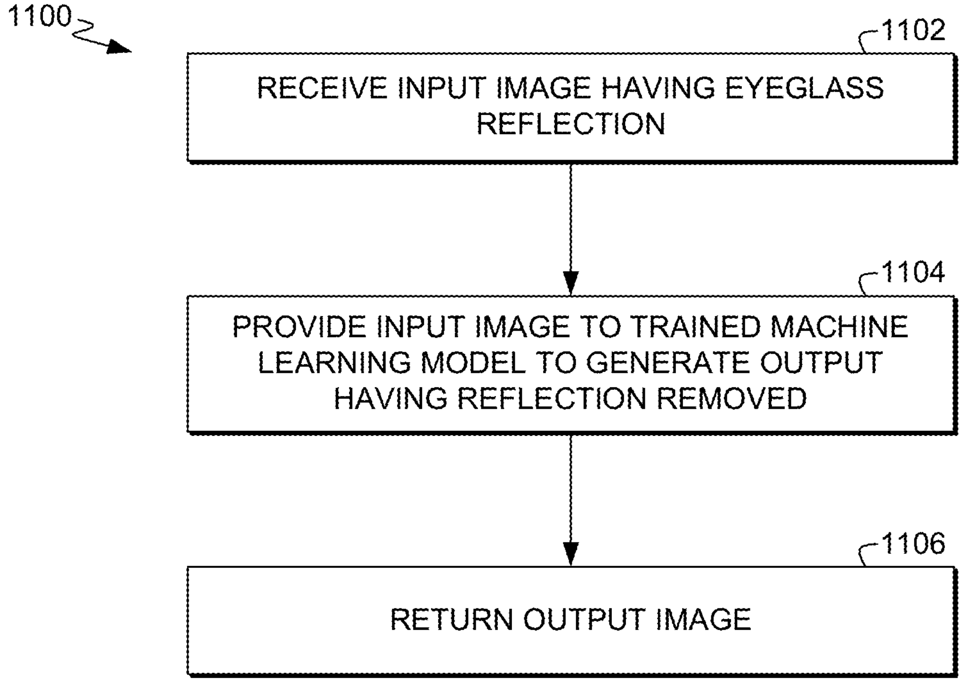
FIG. 11 is a flow diagram showing a method for performing reflection removal in accordance with some implementations of the present disclosure.

FIG. 11 provides a flow diagram showing a method 1100 for performing reflection removal. The method 1100 can be performed, for instance, by the reflection removal component 114 of FIG. 1. As shown at block 1102, an input image is received. The input image is a face image with eyeglasses having a reflection. At block 1104, the input image is provided to a trained machine learning model that has been trained on paired image data generated in accordance with the technology described herein (e.g., using the method 900 of FIG. 9). The trained machine learning model generates an output image with the reflection removed from the eyeglasses in the input image, and the output image is returned, as shown at block 1106.

Exemplary Operating Environment

Figure 12:
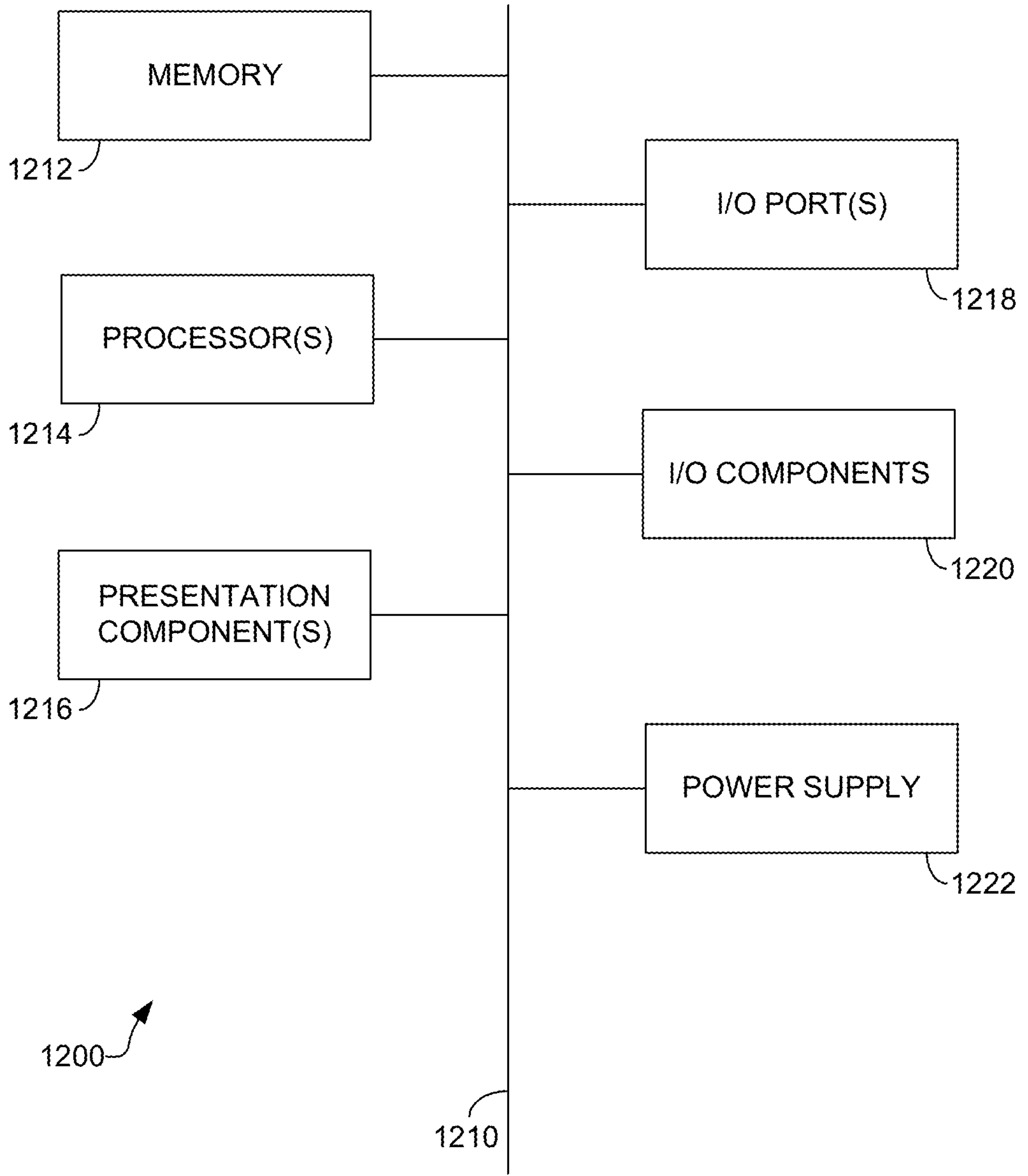
FIG. 12 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 12 in particular, an exemplary operating environment for implementing embodiments of the present technology is shown and designated generally as computing device 1200. Computing device 1200 is but one example of a suitable computing environment and is not intended to suggest any limitation as to the scope of use or functionality of the technology. Neither should the computing device 1200 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what can be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 12 is merely illustrative of an exemplary computing device that can be used in connection with one or more embodiments of the present technology. Distinction is not made between such categories as “workstation,” “server,” “laptop,” “hand-held device,” etc., as all are contemplated within the scope of FIG. 12 and reference to “computing device.”

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media can comprise computer storage media and communication media.

Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory can be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which can be built in. Illustrative components include a microphone, joystick, game pad, satellite dish, scanner, printer, wireless device, etc. The I/O components 1220 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1200. The computing device 1200 can be equipped with depth cameras, such as, stereoscopic camera systems, infrared camera systems, RGB camera systems, and combinations of these for gesture detection and recognition. Additionally, the computing device 1200 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving." "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

generating a training dataset comprising a plurality of image pairs, each image pair in the plurality of image pairs comprising a first version of a corresponding face image with eyeglasses not having a reflection and a second version of the corresponding face image with eyeglasses having a reflection, wherein a first image pair from the plurality of image pairs in the training dataset is generated by:

obtaining a first version of a first face image with eyeglasses not having a reflection, obtaining a reflection image, performing, using a segmentation model, eyeglasses segmentation on the first version of the first face image to determine an eyeglasses area in the first version of the first face image, determining a reflection area in the eyeglasses area by the computing device selecting a point in the eyeglasses area using a random sampling process, the computing device generating a polygon around the selected point using one or more randomly sampled geometric parameters, and the computing device determining the reflection area as an intersection of the eyeglasses area and the polygon, generating a second version of the first face image with eyeglasses having a reflection by compositing the reflection image within the reflection area in the eyeglasses area, and pairing the first version of the first face image with eyeglasses not having a reflection with the second version of the first face image with eyeglass having a reflection; and training a machine learning model using on the training dataset to provide a trained machine learning model that performs reflection removal on input face images with eyeglass reflections.

2. The one or more computer storage media of claim 1, wherein obtaining the first version of the first face image comprises:

generating the first version of the first face image using a second machine learning model.

3. The one or more computer storage media of claim 1, wherein the reflection image comprises a glare reflection image, and wherein obtaining the reflection image comprises:

selecting a random color;

generating a gradient image from the random color; and providing the gradient image as the glare reflection image.

4. The one or more computer storage media of claim 1, wherein the reflection image comprises a scene reflection image, and wherein obtaining the reflection image comprises:

generating the scene reflection image using a second machine learning model.

5. The one or more computer storage media of claim 1, wherein compositing the reflection image in the reflection area of the eyeglasses area comprises:

warping a shape of the reflection image to a shape of the reflection area to provide a warped reflection image.

6. The one or more computer storage media of claim 5, wherein compositing the reflection image in the reflection area of the eyeglasses area further comprises:

generating pixel values for an area of the second version of the first face image corresponding to the reflection area of the first face image by combining weighted pixel values of the warped reflection image and weighted pixel values of the reflection area in the first face image.

7. A computer-implemented method comprising:

obtaining a plurality of face images having eyeglasses without reflections;

obtaining a plurality of reflection images;

generating, by a computing device, a plurality of composite images from the face images and the reflection images, each composite image having a reflection image from the plurality of reflection images composited in a reflection area of eyeglasses in each face image from the plurality of face images, wherein a first composite image for a first face image from the plurality of face images is generated by:

performing, using a segmentation model, eyeglasses segmentation on the first face image to determine an eyeglasses area in the first face image, determining a reflection area in the eyeglasses area in the first face image by the computing device generating a polygon around a point in the eyeglasses area using one or more randomly sampled geometric parameters, and the computing device determining the reflection area as an intersection of the eyeglasses area and the polygon, and compositing a first reflection image from the plurality of reflection images in the reflection area in the first face image; and training a machine learning model using the face images and the composite face images to provide a trained machine learning model that removes reflections from eyeglasses in input images.

8. The computer-implemented method of claim 7, wherein the first face image from the plurality of face images is obtained by generating the first face image using a generator model.

9. The computer-implemented method of claim 7, wherein the first reflection image from the plurality of reflection images comprises a glare reflection image generated by selecting a random color and generating a gradient image based on the random color.

10. The computer-implemented method of claim 9, wherein a second reflection image from the plurality of reflection images comprises a scene reflection image.

11. The computer-implemented method of claim 10, wherein the scene reflection image is generated using a generator model.

12. The computer-implemented method of claim 7, wherein compositing the first reflection image from the plurality of reflection images in the reflection area of the first face image comprises:

warping a shape of the first reflection image to a shape of the reflection area of the eyeglasses area in the first face image to provide a warped reflection image; and generating pixel values for an area of the first composite image corresponding to the reflection area of the first face image by combining weighted pixel values of the warped reflection image and weighted pixel values of the reflection area in the first face image.

13. A computer system comprising:

one or more processors; and one or more computer storage media storing computer-useable instructions that, when used by the one or more processors, causes the one or more processors to perform operations comprising:

generating a training dataset having paired image data, the paired image data including a first image pair comprising a first face image and a first composite image, the first image pair generated by:

generating, using a generator model, the first face image, the first face image having eyeglasses without a reflection, obtaining a first reflection image, performing, by a segmentation model, eyeglasses segmentation on the first face image to provide an eyeglasses area in the first face image, determining a reflection area in the eyeglasses area of the first face image by the one or more processors generating a polygon around a point in the eyeglasses area using one or more randomly sampled geometric parameters, and the one or more processors determining the reflection area as an intersection of the eyeglasses area and the polygon, and compositing the first reflection image in the reflection area of the first face image to generate the first composite image; and training a machine learning model using the paired image data to provide a trained machine learning model that performs eyeglass reflection removal on input face images.

14. The computer system of claim 13, wherein the first reflection image comprises a glare reflection image or a scene reflection image.

15. The computer system of claim 13, wherein compositing the first reflection image in the reflection area of the first face image to generate the first composite image comprises:

warping a shape of the first reflection image to a shape of the reflection area to provide a warped reflection image; and generating pixel values for an area of the first composite image corresponding to the reflection area of the first face image by combining weighted pixel values of the warped reflection image and weighted pixel values of the reflection area in the first face image.

* * * * *